Patented Jan. 16, 1940

2,187,532

UNITED STATES PATENT OFFICE 2,187,532

SOIL ADJUVANT

Martin Leatherman, Hyattsville, Md.; dedicated to the free use of the People of the United States of America No Drawing. Application July 18, 1938, Serial No. 219,784

1 Claim. (Cl. 71—2)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to new and useful soil adjuvants which are also of value as fertilizer conditioners and as fertilizer adjuvants.

An object of my invention is the stimulation of plant growth independently of the addition of fertilizers on the one hand and, on the other, to enhance the beneficial effect when fertilizers are employed.

Another object of my invention is the conservation of humus without harming or interfering with growing plants. This objective is brought about by an inhibition or retardation of the growth and/or sporulation of micro-organic life in the soil.

A further object of my invention is to hasten the maturity of a given crop.

Still another object of my invention is a means of effectively distributing into the soil certain elements of which only very small amounts are needed.

I accomplish these objects by the use of finely divided rosin or of certain metallic derivatives thereof, which are usually referred to as resinates.

It is generally admitted that nitrogen is one of the most commonly deficient plant foods in soils which are agriculturally old. Even in the richest soils, growing plants are not assured of a plentiful supply of nitrogen, because of competition with micro-organisms which are able to transform the nitrogen into forms unavailable to plants. I have found that in rich compost-mixed greenhouse soils, I am able to obtain a remarkable increase in rate of growth of plants by incorporating into the soil, either finely divided rosin, or any one or more of various finely divided metallic resinates, such as aluminum, cadmium, calcium, copper, iron, magnesium, manganese, potassium, titanium, and zinc.

In some cases soils are lacking in certain metallic elements, and I have found that when these are added in the form of resinates, a beneficial effect on plant growth results. In such cases the large bulk of these resinates facilitates distribution through the soil. The low solubility of my resinates prevents injury in cases where uniform distribution is not attained.

In still other cases, plant stimulation may result in part from an effect of the rosin or rosin derivatives upon the tilth and aeration of the soil.

A further advantage of my invention is that I can add a fungicidal or bactericidal resinate with or in admixture with a nitrogenous fertilizer, and thereby enhance the beneficial effect of the fertilizer. This beneficial effect results because micro-organisms are largely prevented from consuming the added nitrogen, and it thus remains available. Rosin itself has certain fungicidal and bactericidal properties, but when it is combined with fungicidal and bactericidal metals, such as copper, cadmium and zinc to form resinates, I have found that its beneficial effects are enhanced. Other resinates which I may use either alone or with fertilizers are those of manganese, calcium, magnesium, aluminum, sodium, potassium, iron and titanium.

It is well known that micro-organisms play a chief part in the degradation and removal of humus from soil. By the use of my invention the processes by which humus is destroyed are retarded and the humus will therefore be conserved as a result.

In practicing my invention, I may, in the case of greenhouse soils, mix the entire mass of soil with finely divided rosin or resinates by means of revolving drums or by turning with shovels or other suitable means. In the case of field soils, the rosin or resinates may be mixed with fertilizers or inert fillers and drilled, or they may be broadcast by any suitable means and disced in.

In treating high organic greenhouse soils, I have obtained excellent stimulation of plant growth by the incorporation into the soil of an amount of powdered rosin or of finely divided metallic resinates equivalent in weight to from one-tenth to three-tenths percent of the soil. These are not rigid limits. Under field conditions I will not ordinarily find it desirable to add this large a proportion, except under conditions of very intensive cultivation, whereas under greenhouse conditions it may be desirable in some cases to add larger proportions.

Having thus described my invention, what I claim for Letters Patent is:

A method for conserving plant food and humus in soil, which comprises incorporating rosin in high organic greenhouse soils in amounts not in excess of 0.3 per cent by weight, thereby retarding microbiological competition with growing plants.

MARTIN LEATHERMAN.